United States Patent [19]

Butler

[11] Patent Number: 4,738,591
[45] Date of Patent: Apr. 19, 1988

[54] BLADE PITCH VARYING MECHANISM

[75] Inventor: Lawrence Butler, Cincinnati, Ohio

[73] Assignee: General Electric Company, Cincinnati, Ohio

[21] Appl. No.: 905,207

[22] Filed: Sep. 9, 1986

[51] Int. Cl.⁴ .............................................. B64C 11/48
[52] U.S. Cl. ................................... 416/129; 416/160; 416/158
[58] Field of Search ................... 416/160, 157 B, 127, 416/129, 158; 60/39.162, 226.1

[56] References Cited

U.S. PATENT DOCUMENTS

| | | | |
|---|---|---|---|
| 2,906,143 | 9/1959 | Musser | 416/160 X |
| 3,467,198 | 9/1969 | Ellinger | 416/193 R |
| 3,672,788 | 6/1972 | Ellinger | 416/160 X |
| 3,825,370 | 7/1974 | McMurtry et al. | 416/160 |
| 3,893,789 | 7/1975 | Andrews | 416/160 |
| 3,964,839 | 6/1976 | Kusiak | 416/155 X |
| 4,099,427 | 7/1978 | Fickelscher | 74/640 |
| 4,488,399 | 12/1984 | Robey et al. | 416/171 X |
| 4,521,158 | 6/1985 | Fickelscher | 416/160 |
| 4,621,978 | 11/1986 | Stuart | 416/127 |
| 4,657,484 | 4/1987 | Wakeman et al. | 416/127 |

FOREIGN PATENT DOCUMENTS

| | | | |
|---|---|---|---|
| 579067 | 7/1924 | France | 416/160 |
| 1196588 | 7/1970 | United Kingdom | 416/160 |
| 1445107 | 8/1976 | United Kingdom | 416/160 |
| 2129502 | 5/1984 | United Kingdom | 416/128 |

OTHER PUBLICATIONS

Aerospace America, Oct. 1984, pp. 52–55 (416–129).

Primary Examiner—Everette A. Powell, Jr.
Attorney, Agent, or Firm—Derek P. Lawrence

[57] ABSTRACT

An apparatus for varying the pitch of propulsor blades of a gas turbine engine by eccentrically driven gears. The gas turbine engine includes a rotating structure, an annular gas flowpath coaxial with the rotating structure, a plurality of rotor blades coupled to the rotating structure and extending into the gas flowpath such that a gas stream flowing through the flowpath causes the rotating structure to rotate with respect to the stationary member and a plurality of variable pitch propulsor blades coupled to and disposed radially outwardly of the rotating structure. The pitch of the blade is varied by a pinion gear coaxially coupled to one of the propulsor blades and an internal gear radially disposed about the pinion gear for driving the pinion gear. Annular displacement of the pinion gear causes angular displacement of the propulsor blade with respect to the rotating structure. The internal gear is revolved about the pinion gear whereby the pinion gear is angularly displaced with respect to the rotating structure.

39 Claims, 4 Drawing Sheets

BLADE PITCH VARYING MECHANISM

FIELD OF THE INVENTION

This invention relates generally to mechanisms for varying the pitch of propulsor blades of gas turbine engines and, more particularly, to a pitch varying mechanism for fan blades for an unducted type gas turbine engine.

BACKGROUND OF THE INVENTION

Gas turbine engines generally include a gas generator which comprises a compressor for compressing air flowing aft through the engine, a combustor in which fuel is mixed with the compressed air and ignited to form a high energy gas stream, and a turbine driven by the gas stream and connected for driving a rotor which in turn drives the compressor. Many engines further include a second turbine, known as a power turbine, located aft of the gas generator and which extracts energy from the gas stream to drive a rotating load with variable pitch blades such as found in the propulsor of helicopters, ducted turbo-fan engines, and turbo-prop engines.

A recent improvement over the turbo-fan and turbo-prop engines described above is the unducted fan engine such as disclosed in U.S. patent application Ser. No. 437,923—Johnson, filed Nov. 1, 1982. In the unducted fan engine, the power turbine includes counterrotating rotors and turbine blades which drive counterrotating unducted fan blades radially located with respect to the power turbines.

The fan blades of the unducted fan engine are variable pitched blades to achieve optimum performance. During operation, fuel efficiency of the engine can be increased by varying the pitch of the blade to correspond to specific operating conditions.

In one prior art apparatus, when it is desired to change the pitch of fan blades coupled to a rotating member which are concentrically disposed about a stationary member, the pitch is varied by a bearing arrangement coupled to a gearing arrangement. One such mechanism is described in U.S. patent application Ser. No. 647,283 filed Sept. 4, 1984 now U.S. Pat. No. 4,657,484. There, the pitch of fan blades is varied by a hydraulic actuator mounted inside the static power turbine support structure. The motion from the actuator is first transmitted to the rotating member by a system of bearings and then to the blades by a system of gears and linkages mounted on the rotating member. It is believed that one disadvantage of using such a pitch change mechanism is the weight of the mechanism. A large actuation force is required to vary the pitch of the propulsor blade as well as to maintain a particular blade pitch when the engine is producing a thrust. Since the actuation force must be transferred to the blade by way of the bearings, gears and linkages, the bearings, gears and linkages must be sufficiently sturdy to transfer the forces without substantially deflecting or deforming. Any deflection or deformation of the mechanism may cause play in the system and, consequently, cause the fan blades to flutter slightly as they are rotated and may also cause a torsional imbalance on the engine. In order for the mechanism to be sufficiently sturdy, it must be massive. The weight of the mechanism added to the rotating member may detrimentally affect the efficiency of the system by increasing the inertia required to turn the rotating member. It is believed another disadvantage of the prior art blade pitch varying mechanism is the poor accessibility of the mechanism. A large portion of the mechanism is built into the stationary power turbine structure. In order to access this portion, one must penetrate the power turbine. Consequently, the location of the mechanism makes access and maintainability quite difficult. It is believed that a further disadvantage of the prior art blade pitch mechanism is poor wearability of the mechanism. The mechanism employs a plurality of racks connected to a corresponding plurality of pinion gears. Positioning of the pinion gears by the racks varies the pitch of the blades. For any given rack and pinion, only a few gear teeth of the pinion will intermesh with a few gear teeth on the rack. Accordingly, the entire force required to maintain a particular blade pitch is carried by these intermeshing teeth. During normal flight and normal operation of the engine, the blade pitch angle will remain relatively constant. Thus, the few intermeshing teeth may wear and/or fail whereas the other teeth may have very little wear.

SUMMARY OF THE INVENTION

Among the objects of the present invention is the provision of an improved apparatus for varying the pitch of propulsor blades in an unducted fan engine which overcomes the above discussed disadvantageous or undesirable features, as well as others, of the prior art. It is another object of the present invention to provide an apparatus for varying blade pitch which is relatively light in weight. It is a further object of the present invention to provide an apparatus for varying blade pitch which is easily accessible. It is yet another object of the present invention to provide an apparatus for varying blade pitch in which a force for maintaining a particular blade pitch is distributed over a large number of gear teeth. These, as well as other features, objects and advantages of the present invention will be in part apparent and in part pointed out hereinafter.

In one embodiment, the present invention is directed to an apparatus for varying blade pitch in a propeller driven gas turbine engine. The engine includes a rotating structure and a plurality of variable pitch propulsor blades extending radially outwardly from the rotating structure. The pitch of the blade is varied by a pinion gear coaxially coupled to one of the propulsor blades and an internal gear radially disposed about the pinion gear for driving the pinion gear. Angular displacement of the pinion gear with respect to the rotating structure causes angular displacement of the propulsor blade with respect to the rotating structure. The internal gear has more gear teeth than does the pinion gear with the gear teeth of the internal gear being dimensioned for intermeshing with the gear teeth of the pinion gear. The internal gear is revolved about the pinion gear whereby the pinion gear is angularly displaced with respect to the rotating structure.

BRIEF DESCRIPTION OF THE DRAWING

The present invention is illustrated by way of example in the FIGURES of the accompanying drawing in which.

The exemplifications set out herein illustrate the preferred embodiments of the present invention in one form thereof, and such exemplifications are not to be construed as limiting either the scope of the invention or the scope of the disclosure thereof in any manner.

DETAILED DESCRIPTION OF THE PREFERRED EMBODIMENTS

Figure 1:
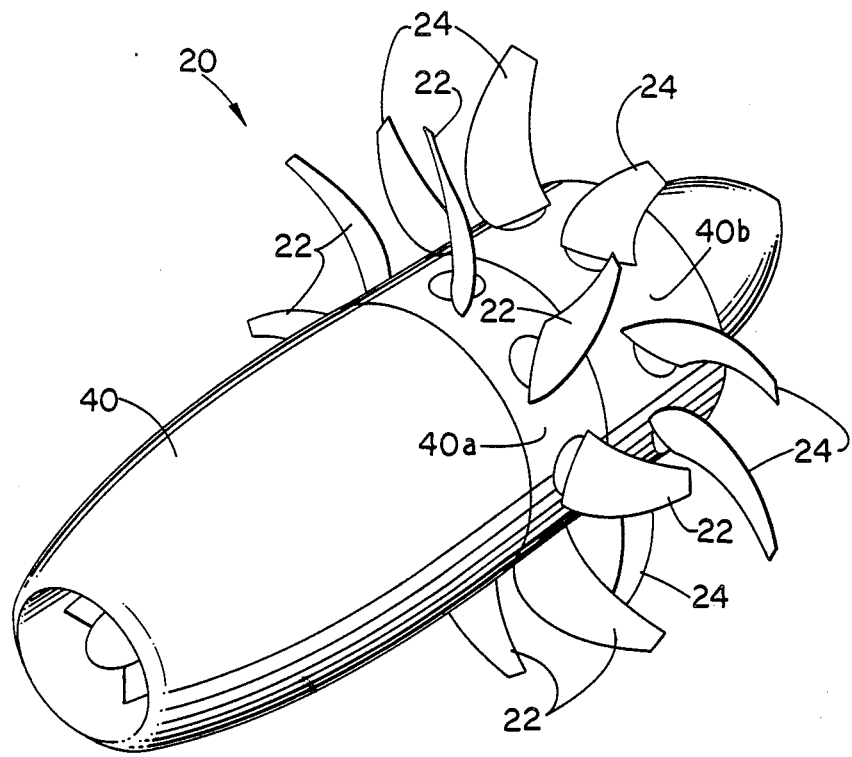
FIG. 1 illustrates a perspective view of an unducted fan type gas-turbine engine.
Figure 2:
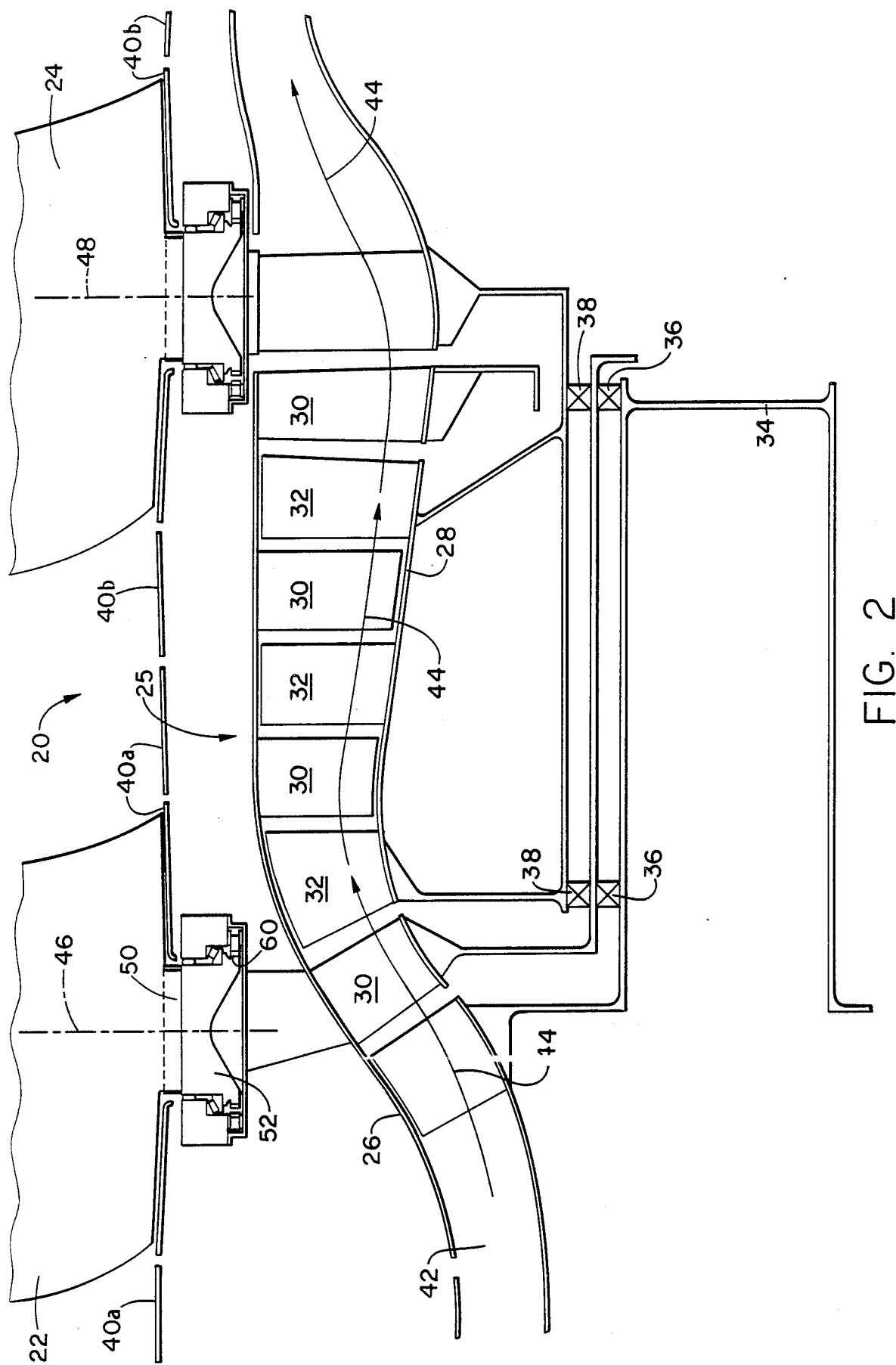
FIG. 2 illustrates a side elevation view, in section, of a turbine section of the unducted fan type gas turbine engine.

FIGS. 1 and 2 illustrate an unducted fan (UDF) jet engine 20 having forward and aft counterrotating propulsor blades 22 and 24 disposed radially outwardly of a power turbine 25. The power turbine 25 includes first and second counterrotating rotors 26 and 28 and first and second counterrotating tubine blades 30 and 32 coupled to the first and second rotors 26 and 28, respectively. The forward and aft propellers 22 and 24 are respectively coupled to the first and second rotors 26 and 28 and rotate therewith. The first rotor 26 is disposed about a hollow static structure 34 and rotatably connected to the static structure 34 by way of first bearings 36. The second rotor 28 is also disposed about the static structure 34 and rotatably coupled to the first rotor 26 by way of second bearings 38. An outer shroud or nacelle 40 encompasses the rotors 26 and 28 with the propulsor blades 22 and 24 disposed radially outwardly of the nacelle 40. The nacelle 40 includes a first sleeve 40a which is coupled to and rotatable with the forward propulsor blades 22, and a second sleeve 40b coupled to and rotatable with the aft propulsor blades 24. The purpose of the nacelle 48 is to provide the proper air flow characteristics to optimize the performance of the propulsor blades 22 and 24. The engine 20 further includes an annular gas flowpath 42 formed through the first and second rotors 26 and 28. Air passing through the engine 20 and to the gas flow-path 42 is compressed and heated to form a high energy (high pressure/high temperature) gas stream, denoted generally by arrow 44. The high energy gas stream 44 flows through the first and second rotors 26 and 28 to turn the counterrotating turbine blades 30 and 32 to drive the counterrotating propulsor blades 22 and 24, respectively.

To further optimize the performance of the unducted fan engine 20 it is desirable to vary the pitch of the forward propulsor blades 22 and aft propulsor blades 24. Each of the forward propulsor blades 22 has a pitch change axis 46 and each of the aft propulsor blades 24 has a pitch change axis 48 about which the pitch of the blades 22 and 24 may vary. For each of discussion, only the pitch varying mechanism for the forward propulsor blades 22 will be discussed in greater detail below. However, it is to be understood that a similar pitch varying mechanism may be employed for varying the pitch of the aft propulsor blades 24.

With reference to FIGS. 3 through 6 in general, there is illustrated in one form of the invention an apparatus for varying the pitch of each of the propulsor blades 22. Extending radially inward of the propulsor blade 22 is a blade root portion 50 fixedly mounted to a trunnion 52.

Figure 5:
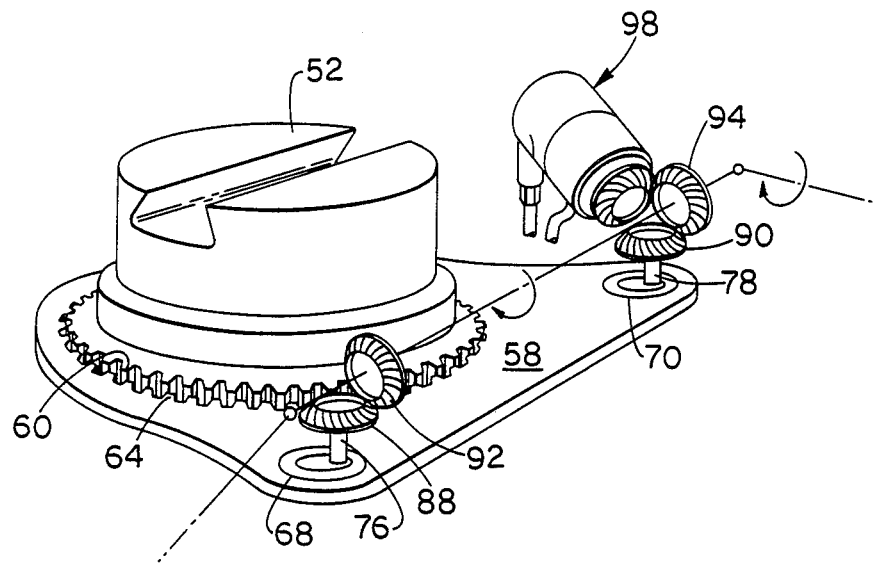
FIG. 5 is a perspective view of a blade pitch varying mechanism in accordance with the present invention.

As best seen in FIG. 5, the trunnion 52 has an inverted V-shaped slot for receiving a matching inverted V-shaped extension of blade root 50. The trunnion 52 is rotatably coupled to the first rotor 26 whereby angular displacement, i.e., rotation about a radius of the engine 20, of the trunnion 52 varies the pitch of the blades 22. The pitch varying mechanism of the present invention includes a spur gear or pinion 60 coaxially coupled to the trunnion 52, an internal gear 64 radially disposed about the spur gear 60 and having more gear teeth than does the pinion gear 60 with the gear teeth of both gears 60 and 64 being dimensioned for intermeshing, and a mechanism for eccentrically revolving the internal gear 64 about the spur gear 60 whereby the spur gear 60 is angularly displaced with respect to a radius of the engine 20. Since the spur gear 60 is fixed to the blade root 50, angularly displacing the spur gear 60 varies the pitch of the propulsor blade 22.

Figure 3:
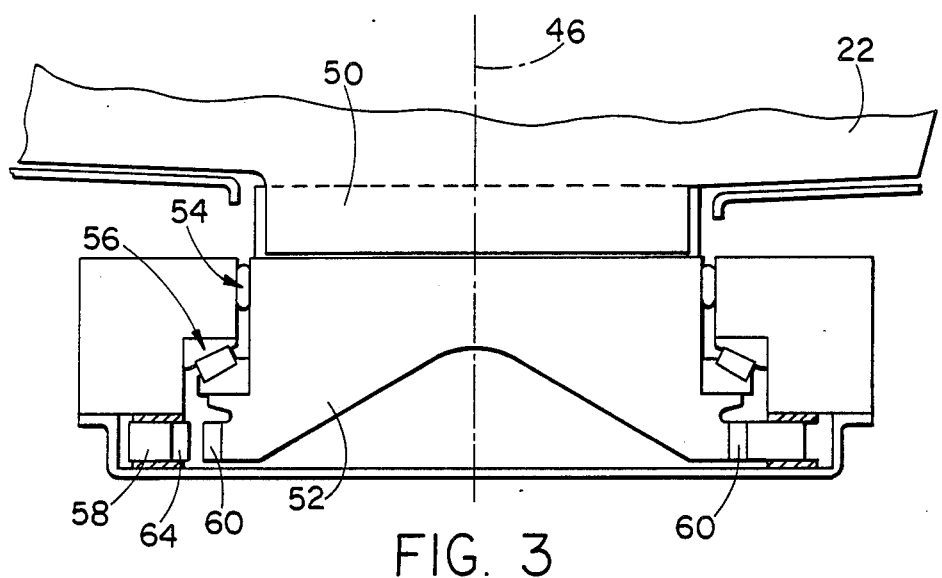
FIG. 3 is an enlarged section view of FIG. 2 illustrating a propulsor blade coupled to a rotating structure.
Figure 4:
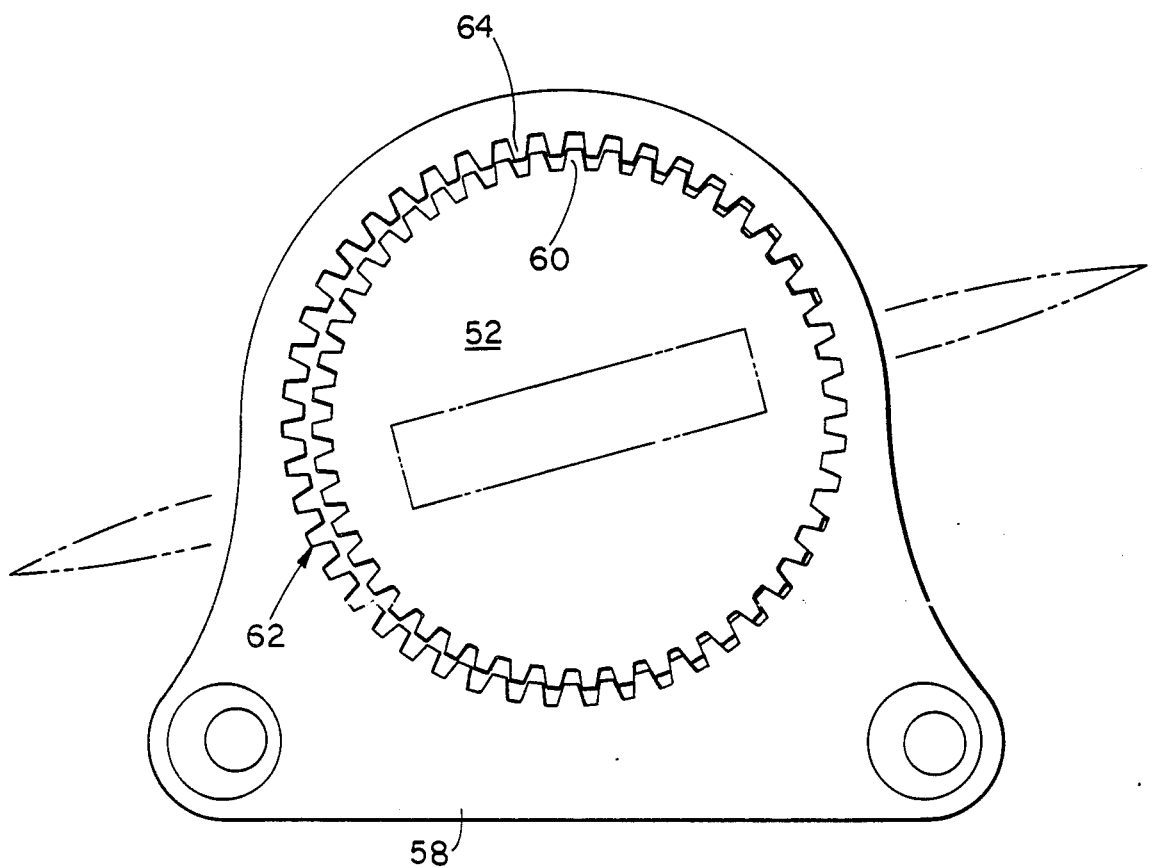
FIG. 4 is a top view of an internal gear encompassing a spur gear.

More particularly and with specific reference to FIGS. 3 and 4 in conjunction with FIG. 2, there is illustrated, in detail, the gearing mechanism. The blade root 50 of the propulsor blade 22 is fixedly coupled to the trunion 52. The trunion 52 is mounted to a portion of the first rotor 26 by way of appropriate roller bearings 54 and thrust bearings 56, well known in the art. The bearings 54 and 56 connect the trunion 52 to the first rotor 26 so that the trunion 62 can pivot or rotate with respect to a radius of the first rotor 26 to vary the pitch of the blade 22. The spur gear 60, which acts as a pinion is fixed to the base of the trunnion 52 and is coaxial therewith. A rigid annulus 58 encompasses the spur gear 60. The annulus 58 includes an internal surface 62 in which the internal or annular gear 64 is disposed for rotating the spur gear 60. An internal or annular gear is by definition a gear having gear teeth on an internal surface. The internal gear 64 has more gear teeth than does the spur gear 60 with the gear teeth of both gears being dimensioned for intermeshing with each other. The internal gear 64 is eccentrically disposed about the spur gear 60 such that the teeth on a portion of the internal gear 64 intermeshes with teeth on a corresponding portion of the spur gear 60. The internal gear 64 is eccentrically revolved about the spur gear 60 to impart a torque to the spur gear 60 thereby rotating the spur gear 60 with respect to the rotating structure 26. By rotating the spur gear 60 with an internal gear rather than with another spur gear, a large number of gear teeth intermesh and the torque imparted to the spur gear 60 is distributed over the large number of intermeshing teeth rather than just a few gear teeth. Consequently, the stresses and associated wear on each tooth are reduced. Although the internal gear 64 eccentrically revolves around the spur gear 60, the internal gear 64 does not rotate with respect to the first rotor 26. Since the spur gear 60 has fewer gear teeth than does the internal gear 64, each complete revolution or orbit which the internal gear 64 makes about the spur gear 60 causes the spur gear 60 to advance or rotate with respect to the internal gear 64 by the difference in the number of teeth between the internal gear 64 and spur gear 60. Suppose, for example, that the internal gear has seventy-four gear teeth and the spur gear 60 has seventy-two gear teeth. For each orbit cycle that the internal gear 64 makes, seventy-four gear teeth of the internal gear 64 meshes with corresponding gear teeth of the spur gear 60. Since the spur gear 60 has two fewer gear teeth than does the internal gear 64, two extra gear teeth on the spur gear 60 meshes with gear teeth on the internal gear 64 for each orbit cycle. Thus, the spur gear 60 is advanced or rotated with respect to the internal gear 64 by two gear teeth. Since there are seventy-two gear teeth on the spur gear 60, each gear tooth constitutes five degrees. Accordingly, an advance of two gear teeth is equivalent to a rotation of ten degrees.

The reduction ratio between the internal gear 64 and the spur gear 60 may be defined as the number of orbit cycles of the internal gear 64 required to rotate the spur gear 60 three hundred and sixty degrees. The reduction ratio is given by the equation:

$$R = N_s/(N_i - N_s),$$

where R is the reduction ratio, $N_s$ is the number of gear teeth on the spur gear 60, and $N_i$ is the number of gear teeth on the internal gear 64. As made apparent by the above equation, the reduction ratio is large if the spur gear 60 has slightly fewer teeth than does the internal gear 64. Providing a large reduction ratio effectively increases the stiffness of the mechanism since a substantial movement of the internal gear 64 translates into a small rotation of the spur gear 60 and the corresponding propulsor blade 22. Additionally, the larger the reduction ratio, the larger the number of gear teeth simultaneously intermeshing and the larger the disbursement of the torque imparted to the gear. Consequently, a large reduction ratio decreases the overall wear on the gears 60 and 64.

Figure 6:
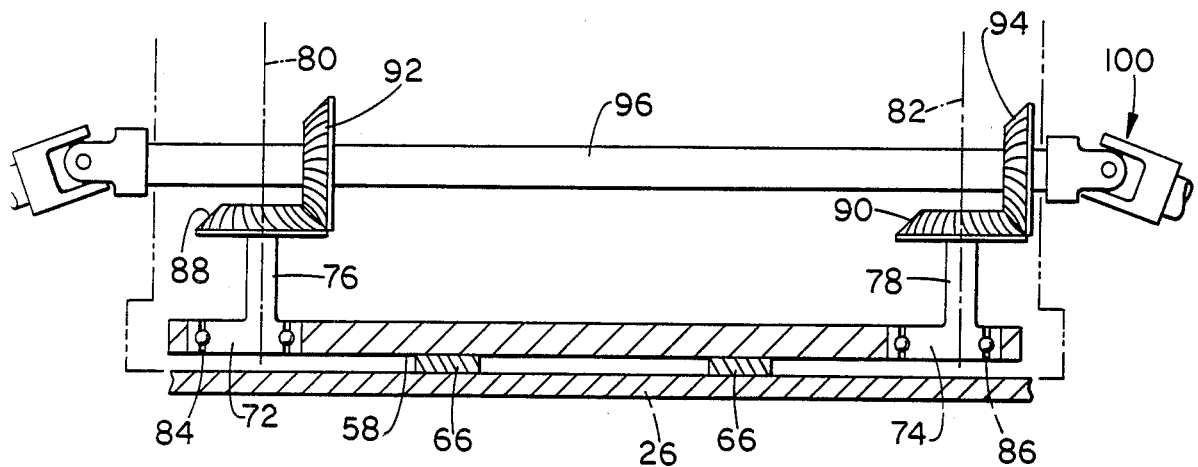
FIG. 6 illustrates a cross-sectional front view of a beveled gear and universal joint arrangement in accordance with the present invention.

Reference is now made to FIGS. 4 through 6 which illustrate the mechanism for eccentrically revolving the internal gear 64 about the spur gear 60. The annulus 58 is slideably coupled to the first rotor 26 by way of appropriate bearings 66. The annulus 58 further includes two circular voids 68 and 70 dimensioned to receive first and second circular disk members 72 and 74 respectively. First and second shafts 76 and 78 are eccentrically fixed to the first and second circular disk members 72 and 74, respectively, and are both rotatably coupled to the first rotor 26 for rotation about their longitudinal axes, respectively denoted in FIG. 6 by broken lines 80 and 82. The circular disk members 72 and 74 are rotatably coupled to the annulus 58 by appropriate roller bearings 84 and 86 such as, for instance, needle roller bearings. Since the shaft 76 and 78 are eccentrically mounted to the circular disk members 72 and 74, simultaneously rotating the shaft 76 and 78 about their longitudinal axes 80 and 82 causes the circular disk 72 and 74 to eccentrically rotate. The eccentric rotation of the circular member 72 and 74 causes each point on the annulus 58 to move in a circular path thereby causing the internal gear 64 to revolve about the spur gear 60. Preferably, the eccentricity of the circular members 72 and 74 is equivalent to the eccentricity of the internal gear 64 about the spur gear 60 such that the eccentric rotation of the circular members 72 and 74 causes the intermeshing of gear teeth between the spur gear 60 and internal gear 64. If the eccentricity of the circular members 72 and 74 are larger than the eccentricity of the internal gear 64, the gear teeth would bind up. If the eccentricity of the circular members 72 and 74 was less than the eccentricity of the internal gear, rotation of the circular members 72 and 74 would cause slippage between the two gears 60 and 64. By having two eccentrically rotating circular members 72 and 74 rather than just one, the annulus 58 revolves about the spur gear 60 without being angularly displaced with respect to the first rotor 26. Additionally, the eccentricity of the disk shaped member 72 and 74 must be synchronized to prevent the circular members 72 and 74 from binding against the annulus 58.

The simultaneous rotating of the circular members 72 and 74 is accomplished by a drive shaft 96 coupling the two circular members 72 and 74 together. The first and second shafts 76 and 78 protrude from the first rotor 26 and terminate into first and second level gears 88 and 90 respectively. The first and second bevel gears 88 and 90 mate with third and fourth level gears 92 and 94, respectively, with the drive shaft 96 rigidly coupling the third and fourth bevel gears 92 and 94. The drive shaft 96 and corresponding bevel gears 88, 90, 92, and 94 causes one of the circular members 72 and 74 to rotate as the other circular member 72 and 74 is rotated. Accordingly, rotating the drive shaft 96 about its longitudinal axis both synchronizes and causes the eccentric rotation of the circular members 72 and 74. Rotation of the drive shaft 96 is preferably effectuated by a motor 98 such as, for instance, a hydraulic motor or an electric motor, coupled to the fourth beveled gear 94. Thus, the pitch change mechanism of the present invention effectively converts the rotary motion of the motor 98 into a motion for varying the pitch of the propulsor blade 22. If the corresponding beveled gears have an equal number of teeth, the reduction ratio between the drive shaft 96 and the spur gear 60 is the same as the reduction ratio between the internal gear 64 and the spur gear 60. If the reduction ratio is large, than a large rotation of the drive shaft 96 about its longitudinal axis is needed to slightly vary the pitch of the propulsor blades 22. Accordingly, blade pitch variation caused by play or back lash between the corresponding bevel gears will be negligible. Preferably, a blade pitch mechanism, as described above, is provided for each propulsor blade 22 to vary the pitch of each blade 22. Additionally, universal joints 100, well known in the art couple the drive shafts of adjacent blade pitch mechanism to synchronize the rotation of each drive shaft, thereby synchronizing the pitch of all of the propulsor blades. If high reduction ratios between the corresponding drive shafts and spur gears are employed, play between the drive shafts will have virtually no affect on the blade pitch angle and will not affect the synchronization of the blade pitch.

As illustrated in FIG. 2, the pitch varying mechanism of the present invention is positioned adjacent to the blade root 50 and disposed outwardly of the gas flowpath 42. Positioning the mechanism in this manner provides high accessibility since the power turbine itself need not be penetrated to service the mechanism. Thus, the time and/or expense in servicing the merchandise is minimized.

While the principles of the invention have now been made clear in an illustrative embodiment, it will become obvious to those skilled in the art, many modifications in structure, arrangement, portions and components used in the practice of the invention and otherwise which are particularly adapted for specific operating requirements without departing from those principles. Accordingly, it is intended that the description be interpreted as illustrative and not in a limiting sense and that the invention be given a scope commensurate with the appended claims.

What is claimed is:

1. A gas turbine engine comprising:
   (a) a stationary member;
   (b) first and second rotating members coaxially disposed about said stationary member;

(c) an annular gas flowpath coaxial with said first and second rotating members;

(d) a plurality of first and second rotor blades attached to said first and second rotating members, respectively, and extending into said flowpath such that a gas stream flowing through said flowpath causes said first and said second rotating members to counterrotate;

(e) a plurality of forward and aft variable pitch propulsor blades coupled to and disposed radially outwardly of said first and second rotating members, respectively;

(f) a driven gear coaxially coupled to one of said propulsor blades whereby angular displacement of said driven gear with respect to a radius of said rotating member causes a pitch change of said propulsor blade;

(g) a driving gear coupled to said driven gear, one of said driven gear and said driving gear being an internal gear and the other of said driven gear and said driving gear being a pinion gear, said internal gear being eccentrically disposed about said pinion gear and having more gear teeth than does said pinion gear with the gear teeth of both said internal gear and said pinion gear being dimensioned for intermeshing; and (h) means for eccentrically revolving said driving gear with respect to said driven gear whereby said driven gear is angularly displaced in response to said driving gear for changing blade pitch.

2. A gas turbine engine in accordance with claim 1 wherein;
   (a) said driven gear comprises said pinion gear; and
   (b) said driving gear comprises said internal gear.

3. A gas turbine engine in accordance with claim 2 further comprising means for preventing angular rotation of said internal gear with respect to a radius of said rotating member.

4. A gas turbine engine in accordance with claim 2 wherein said revolving means comprise:
   (a) a first circular member coupled to said rotating member;
   (b) means for eccentrically rotating said first circular member with respect to said rotating structure; and
   (c) means for converting the eccentric rotation of said first circular member into a revolving motion of said internal gear about said pinion gear.

5. A gas turbine engine in accordance with claim 4 further comprising means for preventing angular rotation of said internal gear with respect to said rotating member.

6. A gas turbine engine in accordance with claim 5 wherein said internal gear is on an internal surface of a rigid annulus.

7. A gas turbine engine in accordance with claim 6 wherein said converting means comprise a first circular void within said annulus and dimensioned to receive said first circular member whereby the eccentric rotation of said first circular member with respect to said rotating member causes each point on said annulus to move in a circular path thereby causing said internal gear to revolve about said pinion gear.

8. A gas turbine engine in accordance with claim 7 wherein said means for eccentrically rotating said first circular member comprises:
   (a) a shaft rotatably coupled to said rotating member and rotatable, with respect to said rotating member, about a longitudinal axis of said shaft, said first circular member being eccentrically fixed to said shaft whereby rotation of said shaft with respect to said rotating member causes said first circular member to eccentrically rotate with respect to said rotating member; and
   (b) motor means coupled to said shaft for rotating said shaft.

9. A gas turbine engine in accordance with claim 8 wherein said motor means comprise a hydraulic motor.

10. A gas turbine engine in accordance with claim 7 wherein said means for preventing angular rotation of said internal gear with respect to said rotating member comprises:
    (a) a second circular void within said annulus;
    (b) a second circular member within said second void and eccentrically coupled to said rotating member whereby the eccentricity of said second circular member is substantially equivalent to the eccentricity of said first circular member; and
    (c) means for synchronizing the rotation of said first circular member with the relative rotation of said second circular member.

11. A gas turbine engine in accordance with claim 10 further comprising means for synchronizing the pitch of all said propulsor blades.

12. A gas turbine engine in accordance with claim 10 further comprising blade pitch varying means coupled to each of said propulsor blades.

13. A gas turbine engine in accordance with claim 12 further comprising means for synchronizing the pitch of all of said propulsor blades.

14. In a gas turbine engine including a stationary member, a rotating structure coaxially disposed about the stationary member, and annular gas flowpath coaxial with the rotating structure, a plurality of rotor blades coupled to the rotating structure and extending into the gas flowpath such that a gas stream flowing through the flowpath causes the rotating structure to rotate with respect to the stationary member, and a plurality of variable pitch propulsor blades coupled to and disposed radially outwardly of the rotating structure, means disposed radially outwardly of the annular gas flowpath for varying the pitch of the propulsor blades comprising:
    (a) a driven gear coaxially coupled to one of the propulsor blades whereby angular displacement of said driven gear with respect to the rotating structure causes angular displacement of the propulsor blade with respect to the rotating structure;
    (b) a driving gear coupled to said driven gear, one of said driven gear and said driving gear being an internal gear and the other of said driven gear and said driving gear being a pinion gear, said internal gear being eccentrically disposed about said pinion and having more gear teeth than does said pinion gear with the gear teeth of both said internal gear and said pinion gear being dimensioned for intermeshing; and
    (c) means for eccentrically revolving said driving gear with respect to said driven gear whereby said driven gear is angularly displaced with respect to the rotating structure.

15. Blade pitch varying means in accordance with claim 14 wherein:
    (a) said driven gear comprises said pinion gear; and
    (b) said driving gear comprises said internal gear.

16. Blade pitch varying means in accordance with claim 15 further comprising means for preventing angular rotation of said internal gear with respect to the rotating structure.

17. Blade pitch varying means in accordance with claim 15 wherein said revolving means comprise:
   (a) a first circular member coupled to the rotating structure;
   (b) means for eccentrically rotating said first circular member with respect to the rotating structure; and
   (c) means for converting the eccentric rotation of said first circular member into a revolving motion of said internal gear about said pinion.

18. Blade pitch varying means in accordance with claim 17 further comprising means for preventing angular rotation of said internal gear with respect to the rotating structure.

19. Blade pitch varying means in accordance with claim 18 wherein said internal gear is on an internal surface of a rigid annulus.

20. Blade pitch varying means in accordance with claim 19 wherein said converting means comprise a first circular void within said annulus dimensioned to receive said first circular member whereby the eccentric rotation of said first circular member with respect to the rotating structure causes each point on said annulus to move in a circular path thereby causing said internal gear to revolve about said pinion.

21. Blade pitch varying means in accordance with claim 20 wherein said means for eccentrically rotating said first circular member comprises:
   (a) a shaft rotatably coupled to the rotating structure and rotatable, with respect to the rotating structure, about a longitudinal axis of said shaft, said first circular member being eccentrically fixed to said shaft whereby rotation of said shaft with respect to the rotating structure causes said first circular member to eccentrically rotate with respect to the rotating structure; and
   (b) motor means coupled to said shaft for rotating said shaft.

22. Blade pitch varying means in accordance with claim 21 wherein said motor means comprise a hydraulic motor.

23. Blade pitch varying means in accordance with claim 21 wherein said means for preventing angular rotation of said internal gear with respect to the rotating structure comprises:
   (a) a second circular void within said annulus;
   (b) a second circular member within said second void and eccentrically coupled to the rotating structure whereby the eccentricity of said second circular member is substantially equivalent to the eccentricity of said first circular member;
   (c) means for synchronizing the rotation of said first circular member with the relative rotation of said second circular member.

24. Blade pitch varying means in accordance with claim 23 further comprising means for sunchronizing the pitch of all the propulsor blades.

25. Blade pitch varying means in accordance with claim 23 further comprising blade pitch varying means coupled to each of the propulsor blades.

26. Blade pitch varying means in accordance with claim 25 further comprising means for synchronizing the pitch of all of the propulsor blades.

27. In a gas turbine engine including a rotating structure and a plurality of variable pitch propulsor blades extending radially outwardly from the rotating structure, means for varying the pitch of each of the blades comprising:
   (a) a driven gear coaxially coupled about a root of the propulsor blades whereby rotation of said driven gear with respect to a radius of the rotating structure causes a pitch change of a corresponding propulsor blade;
   (b) a driving gear operatively coupled to said driven gear, one of said driven gear and said driving gear being an internal gear and the other of said driven gear and said driving gear being a pinion gear, said internal gear being eccentrically disposed about said pinion and having more gear teeth than does said pinion gear with the gear teeth of both said internal gear and said pinion being dimensioned for intermeshing; and
   (c) means for eccentrically revolving said driving gear with respect to said driven gear, said driven gear being angularly displaced with resepect to a radius of the rotating structure in response to eccentric motion of said driving gear.

28. Blade pitch varying means in accordance with claim 27 wherein:
   (a) said driven gear comprises said pinion; and
   (b) said driving gear comprises said internal gear.

29. Blade pitch varying means in accordance with claim 28 further comprising means for preventing angular rotation of said internal gear with respect to the rotating structure.

30. Blade pitch varying means in accordance with claim 28 wherein said revolving means comprise:
   (a) a first circular member coupled to the rotating structure;
   (b) means for eccentrically rotating said first circular member with respect to the rotating structure; and
   (c) means for converting the eccentric rotation of said first circular member into a revolving motion of said internal gear about said pinion.

31. Blade pitch varying means in accordance with claim 30 further comprising means for preventing angular rotation of said internal gear with respect to the rotating structure.

32. Blade pitch varying means in accordance with claim 31 wherein said internal gear is on an internal surface of a rigid annulus.

33. Blade pitch varying means in accordance with claim 32 wherein said converting means comprise a first circular void within said annulus and dimensioned to receive said first circular member whereby the eccentric rotation of said first circular member with respect to the rotating structure causes each point on said annulus to move in a circular path thereby causing said internal gear to revolve about said pinion.

34. Blade pitch varying means in accordance with claim 33 wherein said means for eccentricaly rotating said first circular member comprises:
   (a) a shaft rotatably coupled to the rotating structure and rotatable, with respect to the rotating structure, about a longitudinal axis of said shaft, said first circular member being eccentrically fixed to said shaft whereby rotation of said shaft with respect to the rotating structure causes said first circular member to eccentrically rotate with respect to the rotating structure; and
   (b) motor means coupled to said shaft for rotating said shaft.

35. Blade pitch varying means in accordance with claim 34 wherein said motor means comprise a hydraulic motor.

36. Blade pitch varying means in accordance with claim 34 wherein said means for preventing angular rotation of said internal gear with respect to the rotating structure comprises:
 (a) a second circular void within said annulus;
 (b) a second circular member within said second void and eccentrically coupled to the rotating structure whereby the eccentricity of said second circular member is substantially equivalent to the eccentricity of said first circular member; and
 (c) means for synchronizing the rotation of said first circular member with the relative rotation of said second circular member.

37. Blade pitch varying means in accordance with claim 36 further comprising means for synchronizing the pitch of all the propulsor blades.

38. Blade pitch varying means in accordance with claim 36 further comprising blade pitch varying means coupled to each of the propulsor blades.

39. Blade pitch varying means in accordance with claim 38 further comprising means for synchronizing the pitch of all of the propulsor blades.

* * * * *